TAPE APPLYING MOVEMENT

Filed May 29, 1950 4 Sheets-Sheet 1

Inventor
Arnold E. Johnson
By Carpenter Abbott Coulter & Kinney
Attorneys

Inventor
Arnold E. Johnson
By Carpenter, Abbott, Coulter & Kinney
Attorneys

TAPE APPLYING MOVEMENT

Filed May 29, 1950 4 Sheets-Sheet 3

Inventor
Arnold E. Johnson
By Carpenter, Abbott, Coulter & Kinney
Attorneys

Inventor
Arnold E. Johnson
By Carpenter, Abbott, Coulter & Kinney
Attorneys

Patented Sept. 15, 1953

2,652,166

UNITED STATES PATENT OFFICE 2,652,166

TAPE APPLYING MOVEMENT

Arnold E. Johnson, New Canada Township, Ramsey County, Minn., assignor to Minnesota Mining & Manufacturing Company, St. Paul, Minn., a corporation of Delaware Application May 29, 1950, Serial No. 165,035

4 Claims. (Cl. 216—21)

This invention relates to machines for applying normally tacky pressure-sensitive adhesive tape to objects. It particularly concerns the parts that actually apply the tape, i. e., the tape applying mechanisms or movements.

An objective is to provide such a movement that may be readily adapted to use in a variety of types of tape applying machines.

The invention provides a movement comprising a pivoted arm, a roller rotatably mounted at the free end of the arm for conducting tape into adhesive engagement with the surface of an object being taped at a tape applying station, a second roller rotatably mounted on the arm adjacent the first roller, a passive tape severing means adjacent the applying station, means for impelling the free end of the arm toward the station with a length of tape extending between the rollers, the non-adhesive side of the tape facing the periphery of the first roller, and means for impelling the free end of the arm away from the station after a length of tape has been applied to the object, to bring the tape into operative engagement with the severing means at a point between the first roller and the object.

The severing means may be stationary in its normal position adjacent the tape applying station or it may be rendered removable therefrom, as by mounting it on a second pivoted arm.

Illustrative embodiments are described herein and shown in the accompanying drawings in which.

Figure 1:
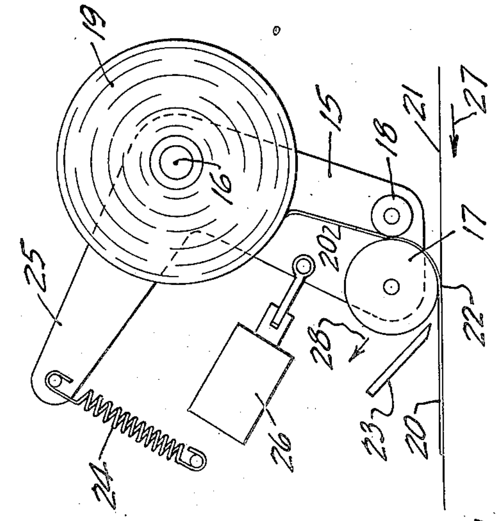
Figure 1 is a diagram of a one arm movement.

Referring to Figure 1, and arm 15, pivoted about an axis 16, has a first roller 17 rotatably mounted on its free end. A second roller 18 is rotatably mounted on the arm in peripheral contact with the first roller 17, i. e., the peripheries of the two rollers are in tangential contact.

A roll 19 of normally tacky pressure-sensitive adhesive tape 20 is mounted for rotation about the axis 16. The tape is led from the roll along the arm 15 and between the rollers 17 and 18 with its non-adhesive side facing the first roller 17 so that when trained around the first roller 17 it will be tacky side out for adherence to the surface of an object 21 being taped.

The point of tangential contact 22 between the periphery of the first roller 17 and the surface of the object 21 being taped, and the immediate vicinity, is sometimes referred to herein as "the tape applying station."

A fixed knife 23 is positioned adjacent the tape applying station at a point which may be described as being "beyond" the first roller 17 in respect to the movement of the object 21 in the direction of the arrow 27.

The free end of the arm 15 is impelled toward the applying station by a spring 24 which acts upon an angular extension 25 of the arm 15. It is impelled away from the station by the solenoid 26.

In operation the object is propelled in the direction of the arrow 27 along a path leading past the applying station with the object 21 in contact with the tacky side of the tape 20, and tape is thereby applied, as shown in Figure 1, the movement of the object serving to withdraw tape from the roll 19.

When a desired length has been applied, the solenoid 26 is actuated and impels the free end of the arm 15 away from the station until the tape 20 is drawn against the knife 23 and is thereby severed at a point between the first roller 17 and the object 21.

The arm 15 remains in a raised position until the next succeeding object to be taped has been advanced to the station, whereupon the solenoid 26 is de-energized, the spring 24 impels the first roller 17 into contact with the object, and the cycle is repeated.

Figure 2:
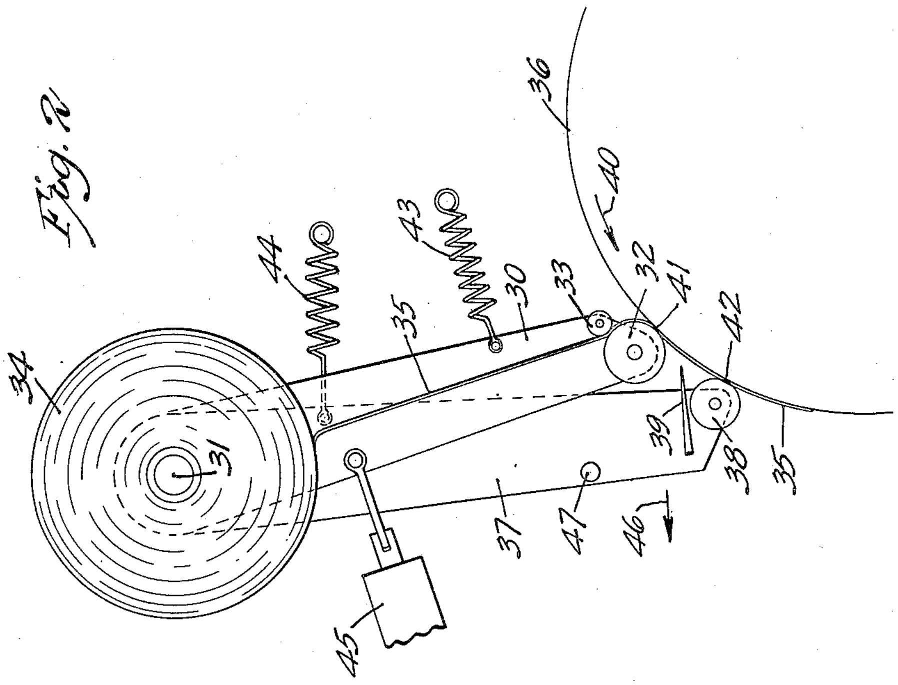
Figure 2 is a diagram of a two arm movement on a single axis.

Referring now to the embodiment shown in Figure 2, a first arm 30, pivoted about an axis 31, has a first roller 32 rotatably mounted at its free end. A second roller 33 is rotatably mounted on the arm in peripheral contact with the first roller 32.

A roll 34 of normally tacky pressure-sensitive adhesive tape 35 is mounted for rotation about the axis 31. The tape is led from the roll along the arm 30 and between the rollers 32 and 33 with its non-adhesive side facing the first roller 32 so that when trained around the first roller 32 it will be tacky side out for adherence to the surface of an object 36 being taped.

A second arm 37, pivoted about the axis 31, has a third roller 38 rotatably mounted at its free end.

A knife 39 is fixed on the second arm 37 near the end of the arm, located so that when the parts are in tape applying position, such as is shown in Figure 2, the knife is positioned adjacent the tape applying station beyond the first roller 32 in respect to the movement of the object 36 in the direction of the arrow 40.

The immediate vicinity of the points of tangential contact 41 and 42 between the peripheries of the first and third rollers 32 and 38, respectively, and the surface of the object 36 being taped, is regarded as the tape applying station in the embodiment of Figure 2.

The free end of the first arm 30 is impelled toward the applying station by a spring 43, the free end of the second arm 37 by a spring 44.

The free ends of both the arms 30 and 37 are impelled away from the station by a solenoid 45 which is connected to the first arm 30. When the solenoid is energized, the first arm 30 moves alone in the direction of the arrow 46 until it engages the pin 47 on the second arm 37 whereby the second arm is moved by the first and the two then move in unison away from the station.

In operation the object 36 to be taped is rotated in the direction of the arrow 40 in a position to have its surface advance along a path leading past the applying station with the surface in contact with the tacky side of the tape 35, and tape is thereby applied, as shown in Figure 2, the rotation of the object serving to withdraw tape from the roll 34.

When a desired length has been applied, the solenoid 45 is actuated and draws the free end of the first arm 30 away from the station until the tape 35 is drawn against the knife 39 and is thereby severed at a point between the first roller 32 and the object 36. Thereafter the moving first arm 30 engages the pin 47 and both arms move in unison away from the station.

The two arms 30 and 37 remain in a withdrawn position until the next succeeding object to be taped has been positioned at the tape applying station, whereupon the solenoid 45 is de-energized, the springs 43 and 44 impel the rollers 32 and 38 into contact with the object, and the cycle is repeated.

Figure 3:
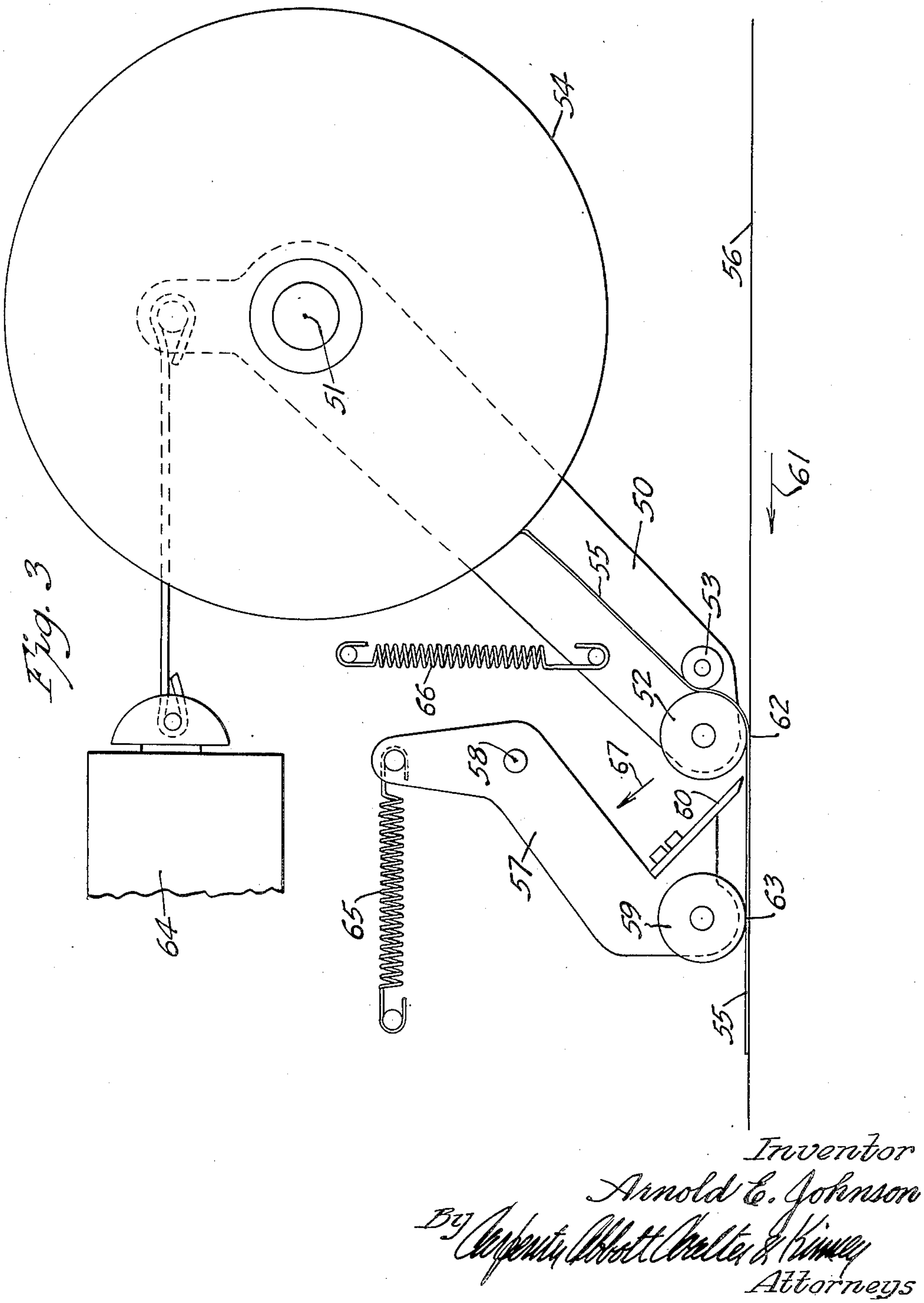
Figure 3 is a diagram of a two arm movement on separated axes.

Referring now to the embodiment shown in Figure 3, a first arm 50 pivoted about an axis 51 has a first roller 52 rotatably mounted at its free end. A second roller 53 is rotatably mounted on the arm in peripheral contact with the first roller 52.

A roll 54 of normally tacky pressure-sensitive adhesive tape 55 is mounted for rotation about the axis 51. The tape is led from the roll along the arm 50 and between the rollers 52 and 53 with its non-adhesive side facing the first roller 52 so that when trained around the first roller 52 it will be tacky side out for adherence to the surface of an object 56 being taped.

A second arm 57, pivoted about an axis 58, has a third roller 59 rotatably mounted at its free end.

A knife 60 is fixed on the arm 57 near the end of the arm, located and positioned so that, when the parts are in tape applying position, such as is shown in Figure 3, the knife is positioned adjacent the applying station and beyond the first roller 52 in respect to the movement of the object 56 in the direction of the arrow 61.

The immediate vicinity of the points of tangential contact 62 and 63 between the peripheries of the first and third rollers 52 and 59, respectively, and the surface of the object 56 being taped, is regarded as the tape applying station in this embodiment.

The free end of the first arm 50 is impelled toward the applying station by a solenoid 64, the free end of the second arm 57 by a spring 65. The free end of the first arm is impelled away from the station by a spring 66.

In operation the object 56 to be taped is propelled in the direction of the arrow 61 along a path leading past the applying station with the surface of the object in contact with the tacky side of the tape 55, and tape is thereby applied, as shown in Figure 3, the movement of the object serving to withdraw the tape from the roll 54.

When a desired length has been applied, the solenoid 64 is de-energized and the spring 66 then draws the free end of the first arm 50 away from the station in the direction of the arrow 67 until the tape 55 is drawn against the knife 60 and is thereby severed at a point between the first roller 52 and the object 56.

The first arm 50 remains in a raised position until the next succeeding object to be taped has been advanced to the applying station, whereupon the solenoid 64 is energized and acts to impel the first roller 52 into contact with the surface of the object 56, and the cycle is repeated.

Figures 4, 5, 6:
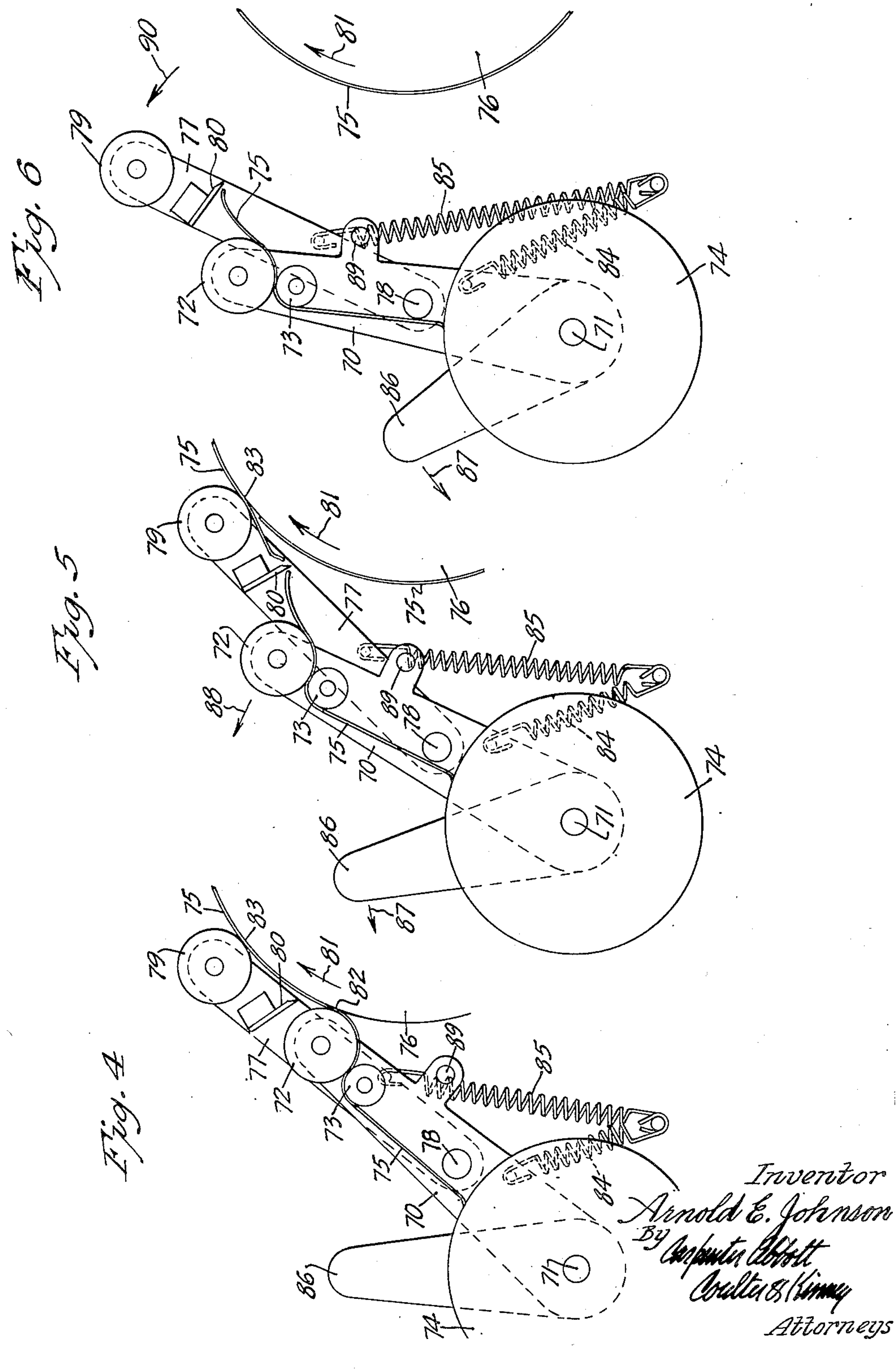
Figures 4, 5 and 6 are diagrams of a two arm movement on separated axes with one arm pivoted on the other, showing the parts in successive positions during the operation of the movement.

Referring now to the embodiment shown in Figures 4, 5 and 6, a first arm 70 pivoted about an axis 71, has a first roller 72 rotatably mounted at its free end. A second roller 73 is rotatably mounted on the arm in peripheral contact with the first roller 72.

A roll 74 of normally tacky pressure-sensitive adhesive tape 75 is mounted for rotation about the axis 71. The tape is led from the roll along the first arm 70 and between the rollers 72 and 73 with its non-adhesive side facing the first roller 72 so that when trained around the first roller 72 it will be tacky side out for adherence to the surface of an object 76 being taped.

A second arm 77 is mounted on the first arm 70 in a manner to pivot about an axis 78. A third roller 79 is rotatably mounted at the free end of the second arm 77.

A knife 80 is fixed on the second arm 77 near the end of the arm, located so that when the parts are in tape applying position, such as is shown in Figure 4, the knife is positioned adjacent the tape applying station and beyond the first roller 72 in respect to the movement of the object 76 past the station in the direction of the arrow 81.

The immediate region of the points of contact 82 and 83 of the rollers 72 and 79 with the object 76, is regarded as the tape applying station in this embodiment.

The free end of the first arm 70 is impelled toward the applying station by a spring 84, the free end of the second arm 77 by a spring 85.

The free ends of both the arms 70 and 77 are impelled away from the station manually by means of a handle 86 fixed to the first arm 70. When the handle 86 is moved in the direction of the arrow 87, the first arm 70 moves alone in the direction of the arrow 88 until a pin 89 on the first arm 70 engages the second arm 77 whereby the second arm is moved by the first in the direction of the arrow 90, and the two then move in unison away from the station.

In operation the object 76 to be taped is rotated in the direction of the arrow 81 in a position to have its surface advance along a path leading past the applying station with the surface in contact with the tacky side of the tape 75, and tape is thereby applied, as shown in Figure 4, the rotation of the object 76 serving to withdraw tape from the roll 74.

When a desired length has been applied, the free end of the first arm 70 is drawn away from the station by the handle 86 until the tape 75 is drawn against the knife 80 and is thereby severed at a point between the first roller 72 and the object 76 (Figure 5). Thereafter, continued movement of the first arm 70 with the pin 89 and the second arm 77 in engagement, moves both arms away from the station to the withdrawn position shown in Figure 6.

The two arms 70 and 77 are held in the said withdrawn position until the next succeeding object to be taped has been positioned at the applying station, whereupon the handle 86 is released and the springs 84 and 85 impel the arms 70 and 77 back into the applying position shown in Figure 4 with the rollers 72 and 79 in contact with the object, and the cycle is repeated.

The movements provided by this invention, as exemplified by those shown in Figures 1 to 6, may be employed in a wide variety of packaging, sealing, taping, labeling, wrapping or other machines or apparatus that perform operations that include the step of applying tape to a surface of an object.

Figures 7, 8:
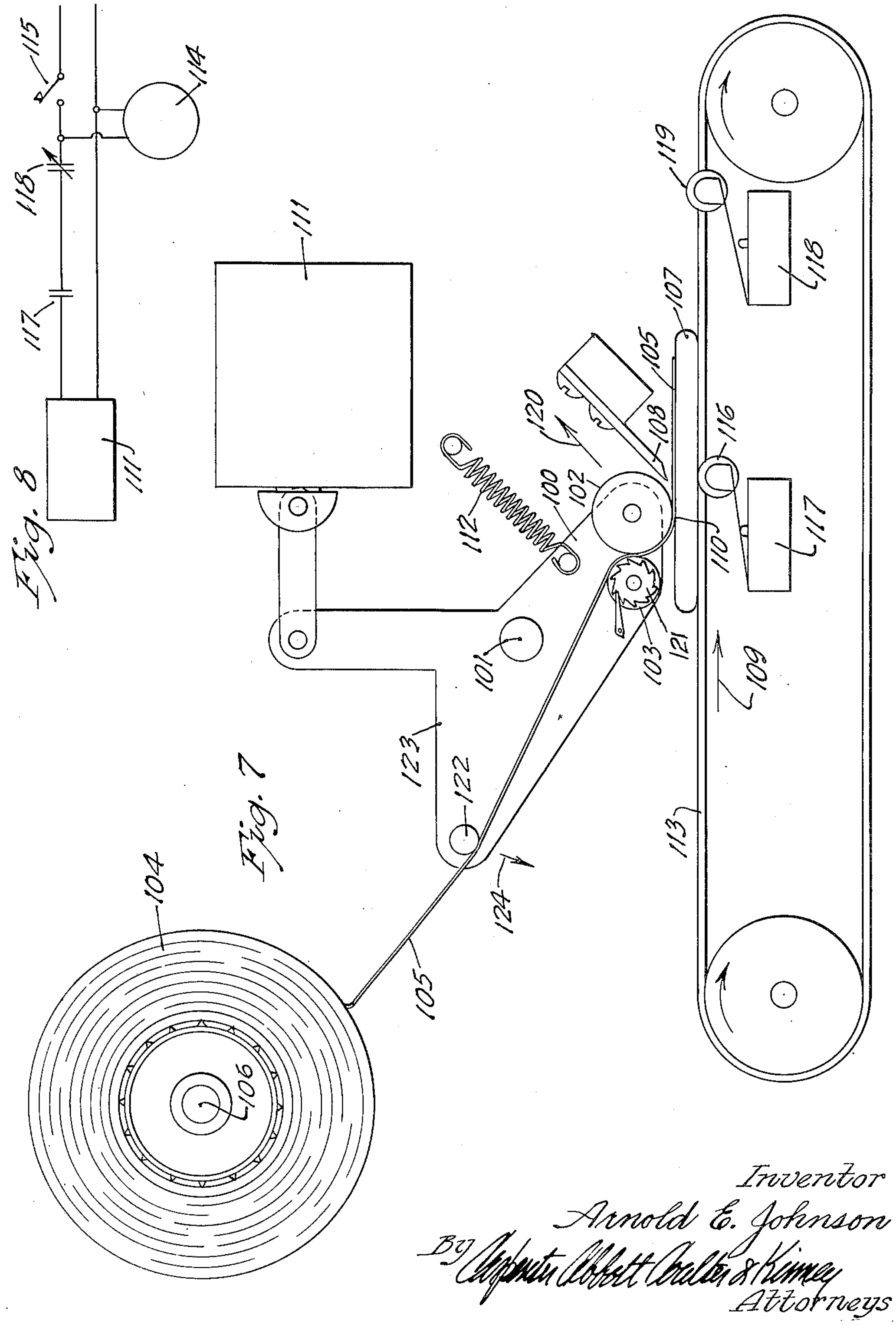
Figure 7 is a diagram of a tape applying machine employing the movement of Figure 1.
Figure 8 is a wiring diagram for the machine of Figure 7.

An example of such a machine and of how the movements provided by this invention may be employed in such machines, is shown in Figures 7 and 8. The machine there shown is for applying measured lengths of tape to the surfaces of flat relatively thin objects, such for example as wrapped packages of sliced bacon. It employs the movement of Figure 1.

An arm 100, pivoted about an axis 101, has a first roller 102 rotatably mounted at its free end. A second roller 103 is rotatably mounted on the arm in peripheral contact with the first roller 102.

A roll 104 of normally tacky pressure-sensitive adhesive tape 105 is mounted for rotation about an axis 106 at a point removed from the arm 100. The tape is led from the roll along the arm 100 and between the rollers 102 and 103 with its non-adhesive side facing the first roller 102 so that when trained around the first roller 102 it will be tacky side out for adherence to the surface of the object 107.

A fixed knife 108 is positioned adjacent the applying station and beyond the first roller 102 in respect to the movement of the object 107 in the direction of the arrow 109.

The applying station is the immediate region of the point of contact 110 between the first roller 102 and the object 107.

The free end of the arm 100 is impelled toward the applying station by a solenoid 111. It is impelled away from the station by a spring 112.

The object 107 is propelled through the machine by an endless belt 113 which is continuously driven through conventional means (not shown) by a motor 114.

The closing of a line switch 115 starts the motor and places the solenoid 111 in readiness. The object 107 is placed on the moving belt 113 and is thereby propelled in the direction of the arrow 109 along a path leading past the applying station.

When the object contacts the actuating roller 116 of the normally open micro switch 117, the switch is thereby closed, the solenoid 111 is energized, the first roller 102 is brought down upon the object, and tape is applied, as shown in Figure 7, the movement of the object serving to withdraw tape from the roll 104.

A second micro switch 118, normally closed, is positioned so that when a predetermined length of tape has been applied, the object will contact its actuating roller 119 and open the switch 118 to break the solenoid circuit. The spring 112 thereupon impels the free end of the arm 100 away from the station in the direction of the arrow 120 until the tape 105 is drawn against the knife 108 and is thereby severed at a point between the first roller 102 and the object 107.

The arm 100 remains in a raised position until the next succeeding object to be taped has been advanced into contact with the switch-actuating roller 116, whereupon the solenoid is energized and impels the first roller 102 into contact with the object with the tape between them, and the cycle is repeated.

Upon the contact of the roller 102 and the object with the tape between them at the beginning of a cycle, as described in the immediately preceding paragraph, the application of the leading end of the tape to the moving object causes a sudden strain on the surface of the object since it requires a relatively hard pull to withdraw tape of the type here employed, from a supply roll thereof, particularly at the start.

Consequently, where the object being taped is wrapped with paper which might tear under the initial strain, or might otherwise be harmed by the sudden pull, or where the tape tends to tear loose at the sudden initial pull, it is desirable to "pre-strip"; i. e., it is desirable to withdraw a short length of tape from the roll 104 before applying the leading end to the object.

To this end, in the embodiment shown in Figure 7, the second roller 103 is equipped with a ratchet means 121 which permits rotation of the roller 103 only in the direction of the feed of the tape. Additionally, an idler roller 122 is rotatably mounted on an extension 123 of the arm 100, the extension being generally opposite the first and second rollers 102 and 103 in respect to the pivot 101. The roller 122 is positioned so as to engage the span of the tape that extends from the supply roll 104 to the rollers 102 and 103 when the spring 112 draws the arm 100 away from the applying station at the conclusion of a cycle.

This stroke of the arm 100 impels the roller 122 downwardly in the direction of the arrow 124. As a result, the leading end of the tape being anchored by its adherence to the one-way roller 103, a short length of tape is withdrawn from the roll 104 so that when the parts return to the applying position shown in Figure 7 in readiness for a new cycle, the span of tape from the roll 104 to the rollers 102 and 103 will be a slack loop. As a result, the moving object is not called upon to withdraw tape from the roll 104 until a substantial length has been applied to the object and the strain on the surface of the object is thus distributed over a wider area.

A movement such as that shown in Figures 4, 5 and 6 has been constructed and successfully employed in the taping of the oval shaped covers of cardboard hat boxes, having the following dimensions in inches: axis 71 to axis 78, 3½; axis 71 to axis of roller 72, 6½; axis 78 to axis of roller 79, 4½; diameter of rollers 72 and 79, ⅞; diameter of roller 73, ⅜; hat box cover 76, 14¼ x 12¼.

A machine such as that shown in Figures 7 and 8 has been constructed and successfully employed in the sealing of paper wrapped packages of sliced bacon, having the following dimensions in inches: axis 101 to axis of roller 102, 1½; axis 101 to axis of roller 122, 1⅞; axis 101 to axis 106, 5; axis of roller 116 to axis of roller 119, 8; diameter of roller 102, ¾; diameter of roller 103, ½; package of bacon 107, 9 x 6 x ⅛.

It will of course be understood that the above dimensions are only exemplary. They may vary widely within the scope of the invention.

The precise patterns and the mechanical expedients shown herein are also exemplary, and may vary widely within the scope of the invention.

For example, in Figure 1 the solenoid 26 or both the solenoid 26 and the spring 24 may, if desired, be dispensed with and the movement operated by hand, using the extension 25 as a handle.

Any means for restricting the roller 103 to rotation in only one direction, may be substituted for the ratchet means 121.

The first and second rollers 17 and 18 in Figure 1 (and the corresponding rollers in the other embodiments) described herein as being in peripheral contact, may instead be separated and not be in contact but be simply adjacent each other, if desired. The illustrated peripheral contact however, is preferred.

For the purposes of this invention the said rollers are regarded as being in peripheral "contact" even when tape is between them, as long as they bear against each other. The expression is thus intended to include constructions where the rollers themselves are actually slightly spaced apart to accommodate thick varieties of tape.

Similarly, the first roller 17 in Figure 1 (and the corresponding rollers in the other embodiments) is regarded as being in "contact" at 22 with the object being taped even though the tape lies between them, as long as the roller bears against the object.

I claim:

1. In a tape applying machine, an applying movement of the character described comprising a pivoted arm, a roller rotatably mounted at the free end of the arm for conducting tape into adhesive engagement with the surface of an object being taped at a tape applying station, a second roller rotatably mounted on the arm adjacent the first roller, a second pivoted arm adjacent the first arm, a third roller rotatably mounted at the free end of the second arm, a passive tape severing means on the second arm near the free end of the arm, means for impelling the free end of the first arm toward the station with a length of tape extending between the first and second rollers, the non-adhesive side of the tape facing the periphery of the first roller, means for impelling the free end of the second arm toward the station, and means for impelling the free end of the first arm away from the station after a length of tape has been applied to the object, to bring the tape into operative engagement with the passive severing means at a point between the first roller and the object.

2. The device of claim 1 in which the two arms are pivoted about separate axes.

3. The device of claim 2 in which the second arm is pivoted to the first arm at a point between the free end of the first arm and the axis about which the first arm pivots.

4. The device of claim 1 in which the two arms are pivoted about a common axis.

ARNOLD E. JOHNSON.

References Cited in the file of this patent

UNITED STATES PATENTS

| Number | Name | Date |
|---|---|---|
| Re. 22,418 | Salfisberg | Jan. 11, 1944 |
| 2,227,171 | Anderson | Dec. 31, 1940 |
| 2,404,317 | Salfisberg | July 16, 1946 |
| 2,511,857 | Fritzinger | June 20, 1950 |
| 2,515,130 | Locke et al. | July 11, 1950 |